US008056924B2

(12) United States Patent
Hatfield et al.

(10) Patent No.: US 8,056,924 B2
(45) Date of Patent: Nov. 15, 2011

(54) INFLATABLE AIRBAG ASSEMBLIES WITH ALIGNMENT APERTURES

(75) Inventors: Mark S. Hatfield, Providence, UT (US); Blake Cheal, Perry, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 12/544,952

(22) Filed: Aug. 20, 2009

(65) Prior Publication Data

US 2011/0042923 A1 Feb. 24, 2011

(51) Int. Cl.
*B60R 21/16* (2006.01)

(52) U.S. Cl. ................................ 280/730.2; 280/728.2

(58) Field of Classification Search ............... 280/728.2, 280/730.2, 733

See application file for complete search history.

(56) References Cited

U.S. PATENT DOCUMENTS 5,746,690 A 5/1998 Humbarger et al.
5,899,486 A 5/1999 Ibe
5,944,342 A 8/1999 White et al.
6,073,961 A 6/2000 Bailey et al.
6,099,026 A 8/2000 Ando et al.
6,209,907 B1 4/2001 Fischer
6,223,389 B1 5/2001 Walsh et al.
6,305,707 B1 10/2001 Ishiyama et al.
6,412,810 B1 7/2002 Wipasuramonton et al.
6,415,560 B1 7/2002 Rinderer
6,550,809 B1 4/2003 Masuda et al.
6,626,456 B2 9/2003 Terbu et al.
6,672,612 B2 1/2004 Sauer et al.
6,705,635 B2 3/2004 Hoeft et al.
6,743,162 B2 6/2004 Hieber et al.
6,749,220 B1 6/2004 Wipasuramonton et al.
6,758,490 B2 7/2004 Hoeft et al.
6,796,576 B2 9/2004 Aoki et al.
6,851,702 B2 2/2005 Henderson et al.
6,889,999 B2 5/2005 Dominissini et al.
6,902,187 B2 6/2005 Sonnenberg
6,991,256 B2 1/2006 Henderson et al.
7,083,188 B2 8/2006 Henderson et al.
7,097,200 B2 8/2006 Wold
7,121,579 B2 10/2006 Ochiai et al.
7,125,037 B2 10/2006 Tallerico et al.
7,159,896 B2 1/2007 Ochiai et al.
7,163,231 B2 1/2007 Kumagai
7,172,212 B2 2/2007 Aoki et al.

(Continued)

FOREIGN PATENT DOCUMENTS

DE 10 2005 012 845 9/2006

(Continued)

*Primary Examiner* — Paul N Dickson
*Assistant Examiner* — Robert A Coker
(74) *Attorney, Agent, or Firm* — Sally J Brown; Stoel Rives LLP

(57) ABSTRACT

Inflatable airbag cushions often have modular components attached to them after the main airbag has been manufactured. Such modular components can include external tethers, mounting tabs, mounting assemblies, and fill tubes. Often, these modular components are positioned at predetermined locations on the airbag. Further, the modular components typically have a predetermined orientation. Employing an alignment aperture and at least one landmark on the airbag can allow a modular component to be positioned correctly along at least one axis of the airbag. Landmarks can include seams, edges, folds, and marks, such as ink from printing. Additional apertures, landmarks and/or hardware can be used to assure proper orientation of the modular component on the airbag. The modular component can be coupled to the airbag by stitching.

31 Claims, 17 Drawing Sheets

U.S. PATENT DOCUMENTS

| | | | |
|---|---|---|---|
| 7,261,682 | B2 | 8/2007 | Crookston et al. |
| 7,328,911 | B2 | 2/2008 | Chapman |
| 7,344,154 | B2 | 3/2008 | Yokoyama et al. |
| 7,357,408 | B2 | 4/2008 | Hall et al. |
| 7,407,182 | B2 | 8/2008 | Aoki et al. |
| 7,478,826 | B2 | 1/2009 | Soderquist et al. |
| 7,547,038 | B2 | 6/2009 | Coleman |
| 7,568,730 | B2 | 8/2009 | Kwon |
| 7,641,220 | B2 | 1/2010 | Visker et al. |
| 7,731,224 | B2 | 6/2010 | Enriquez et al. |
| 7,823,914 | B2 | 11/2010 | Cheal et al. |
| 2002/0158450 | A1 | 10/2002 | Hoeft et al. |
| 2002/0195803 | A1 | 12/2002 | Terbu et al. |
| 2003/0006589 | A1 | 1/2003 | Aoki et al. |
| 2003/0042712 | A1 | 3/2003 | Henderson et al. |
| 2003/0184057 | A1 | 10/2003 | Kumagai |
| 2004/0000775 | A1 | 1/2004 | Henderson et al. |
| 2005/0010335 | A1 | 1/2005 | Kettenacker et al. |
| 2005/0029778 | A1 | 2/2005 | Weber et al. |
| 2005/0046154 | A1 | 3/2005 | Rhea et al. |
| 2005/0104335 | A1 | 5/2005 | Henderson et al. |
| 2005/0110256 | A1 | 5/2005 | Cookston et al. |
| 2005/0121887 | A1 | 6/2005 | Inoue et al. |
| 2005/0179238 | A1 | 8/2005 | Kippschull et al. |
| 2005/0206138 | A1 | 9/2005 | Breuninger et al. |
| 2005/0236815 | A1 | 10/2005 | Kismir et al. |
| 2006/0043703 | A1 | 3/2006 | Enriquez |
| 2006/0119084 | A1 | 6/2006 | Coon et al. |
| 2006/0138762 | A1 | 6/2006 | Jang |
| 2006/0192368 | A1 | 8/2006 | Hall et al. |
| 2006/0197316 | A1 | 9/2006 | Watanabe |
| 2006/0237957 | A1 | 10/2006 | Woydick |
| 2007/0003390 | A1 | 1/2007 | Kawai |
| 2007/0019891 | A1* | 1/2007 | Daniel .......................... 383/105 |
| 2007/0024031 | A1* | 2/2007 | Coleman .................... 280/728.2 |
| 2007/0090630 | A1 | 4/2007 | Wilmot |
| 2007/0090634 | A1 | 4/2007 | Jang et al. |
| 2007/0126211 | A1 | 6/2007 | Moerke et al. |
| 2007/0216139 | A1 | 9/2007 | Mazanek et al. |
| 2007/0296189 | A1 | 12/2007 | Berntsson et al. |
| 2008/0061535 | A1 | 3/2008 | Everard et al. |
| 2008/0197610 | A1 | 8/2008 | Downey |
| 2008/0217892 | A1 | 9/2008 | Maripudi et al. |
| 2008/0217896 | A1 | 9/2008 | Visker et al. |
| 2008/0224457 | A1 | 9/2008 | Brough et al. |
| 2008/0284142 | A1* | 11/2008 | Cheal et al. ................ 280/730.2 |
| 2010/0327564 | A1 | 12/2010 | Cheal |
| 2011/0018245 | A1 | 1/2011 | Hatfield et al. |
| 2011/0042923 | A1 | 2/2011 | Hatfield et al. |
| 2011/0057422 | A1 | 3/2011 | Cheal et al. |

FOREIGN PATENT DOCUMENTS

| | | |
|---|---|---|
| GB | 2309942 | 8/1997 |
| WO | WO-2004/087471 | 10/2004 |
| WO | WO 2006/097309 | 9/2006 |
| WO | WO 2007/018650 | 2/2007 |
| WO | WO 2008/109396 | 9/2008 |
| WO | WO 2008/144121 | 11/2008 |
| WO | WO-2011/022614 | 2/2011 |
| WO | WO-2011/031584 | 3/2011 |

* cited by examiner

INFLATABLE AIRBAG ASSEMBLIES WITH ALIGNMENT APERTURES

TECHNICAL FIELD

The present disclosure relates generally to the field of automotive protective systems. More specifically, the present disclosure relates to modular components of inflatable curtain airbags with aligning apertures. The present disclosure also relates to methods of aligning modular components of inflatable curtain airbags.

BRIEF DESCRIPTION OF THE DRAWINGS

The present embodiments will become more fully apparent from the following description and appended claims, taken in conjunction with the accompanying drawings, which may not be to scale. Understanding that the accompanying drawings depict only typical embodiments, and are, therefore, not to be considered to be limiting of the disclosure's scope, the embodiments will be described and explained with specificity and detail in reference to the accompanying drawings.

DETAILED DESCRIPTION OF PREFERRED EMBODIMENTS

Figure 1A:
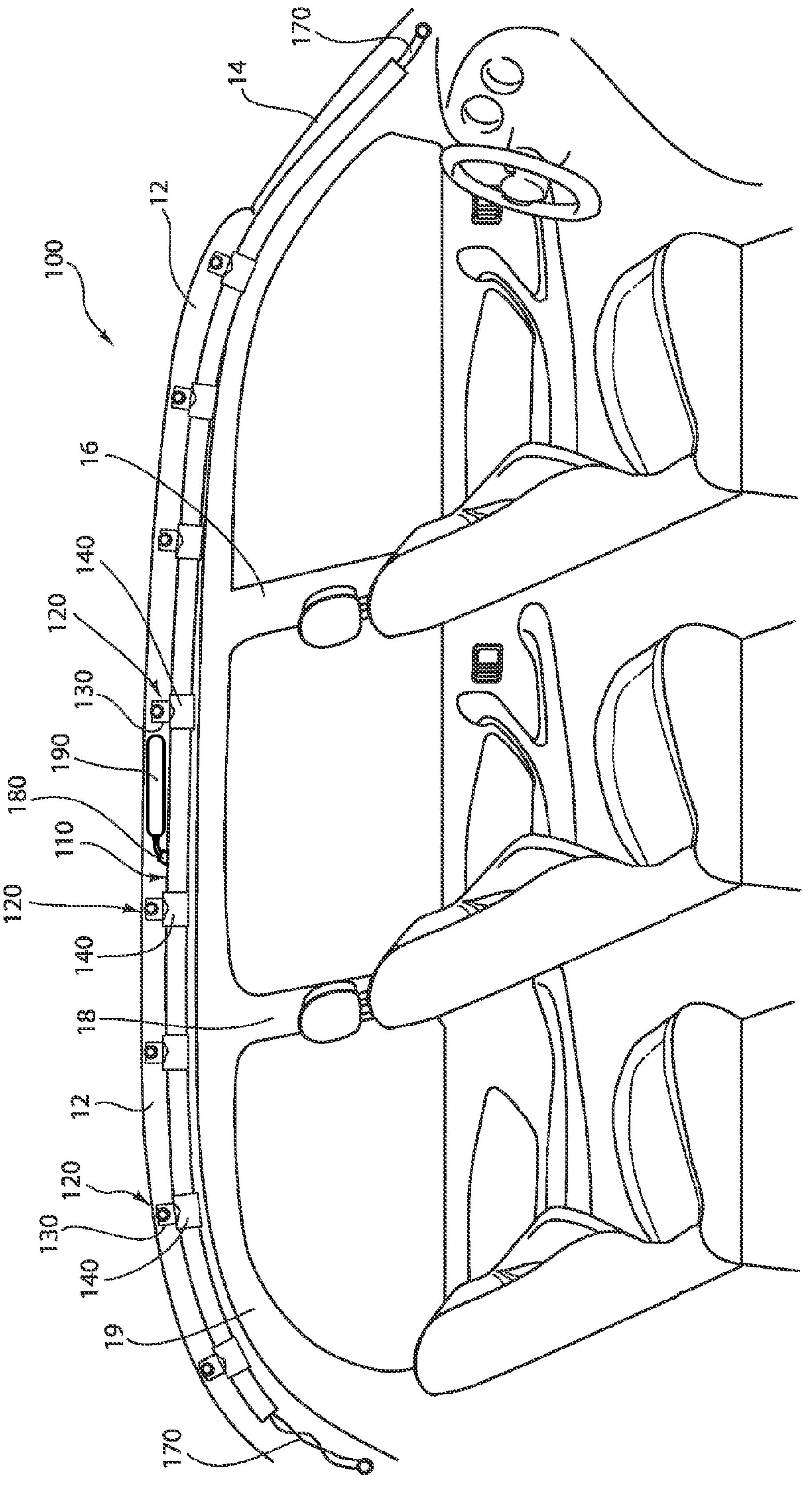
FIG. 1A is a perspective view of one embodiment of an airbag assembly, wherein the airbag assembly comprises a mounting assembly that is coupled to an airbag, wherein the mounting assembly is configured to retain the airbag in a packaged configuration.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" may refer to an inflatable curtain airbag, overhead airbag, front airbag, or any other airbag type.

Inflatable curtain airbags may be used to protect the passengers of a vehicle during a side collision or roll-over event. Inflatable curtain airbags typically extend longitudinally within the vehicle and are usually coupled to or next to the roof rail of the vehicle. The inflatable curtain airbag may expand in a collision scenario along the side of the vehicle between the vehicle passengers and the side structure of the vehicle. In a deployed state, an inflatable curtain airbag may cover at least a portion of side windows and a B-pillar of the vehicle. In some embodiments, inflatable curtain airbags may extend from an A-pillar to a C-pillar of the vehicle. In alternative embodiments, inflatable curtain airbags may extend from the A-pillar to a D-pillar of the vehicle.

Inflatable curtain airbags are typically installed adjacent to the roof rail of a vehicle in an undeployed state, in which the inflatable curtain airbag is rolled or folded or a combination thereof and retained in the folded or rolled configuration by being wrapped at certain points along the airbag. In this state, the airbag may be said to be in a packaged configuration. When deployed, the airbag exits the packaged configuration and assumes an extended shape. When extended and inflated, the airbag may be said to comprise a deployed configuration. Thus, an airbag mounting apparatus typically allows for a secure connection between the vehicle and the airbag, yet allows the airbag to change configurations from the packaged configuration to the deployed configuration.

FIG. 1A depicts airbag assembly 100 from a perspective view, wherein an inflatable curtain airbag 110 that is in a packaged configuration, and is mounted adjacent a vehicle roof rail 12. Airbag assembly 100 may comprise inflatable curtain airbag 110, an airbag mounting assembly 120, tethers 170, a fill tube 180, and an inflator 190. Airbag assembly 100 may be considered to comprise one or more modular components.

A modular component may be defined as a component that is coupled to an inflatable airbag, but is not contiguous with the fabric from which the airbag is formed. A modular component may also be considered to be a sub-assembly of an airbag assembly, wherein the component is coupled to the inflatable airbag after the airbag has been manufactured; however, some components may be coupled to the airbag during airbag manufacture. A modular component may be manufactured before or after the inflatable airbag is manufactured. A modular component need not be suitable for use with more than one type of inflatable airbag or species of airbag. For example, a modular component may have a predetermined length that is intended for use in a specific vehicle make and model and with a predetermined airbag design, such that the component may not be suitable for use in a different vehicle make and model or with a different inflatable curtain airbag. The modular component may be located at or coupled to a periphery of the airbag, such that the component may be called a "peripheral component" or a "peripheral modular component". Further, the modular component may be called a "feature," "attachable feature," or "separate feature". Mounting assembly 120, tethers 170, and fill tube 180 can be considered modular components of inflatable curtain airbag assembly 100. In other embodiments, modular components may include external or internal vents, such as cinch tubes, internal tethers, baffles, and/or diffusers.

A modular component may be located at a predetermined position on an inflatable airbag, wherein the predetermined position is defined by a location along one or more axes. For example, a modular component may have a predetermined position along an axis that runs from a top portion or a bottom portion of an airbag (Y-axis), but its position along an axis that runs laterally from a first side to a second (X-axis) side can vary. Alternatively, a predetermined location for a modular component may be defined by a position on both X- and Y-axes. Further a predetermined location for a modular component may be defined by a position on X-, Y-, and Z-axes. Modular components may be coupled to any type of inflatable airbag, including: inflatable curtain airbags, knee airbags, side airbags, driver airbags, and/or passenger airbags.

During manufacture, coupling of a modular component at a predetermined location on an inflatable airbag can be facilitated by one or more assembly aides. For example, a landmark on the modular component can be aligned with a landmark on the inflatable airbag or a landmark on another modular component. Landmarks on an inflatable airbag or a modular component may be at a predetermined location and may include edges, woven or sewn seams, folds, apertures, protrusions, marks, or any combination of the proceeding. If the portion of the inflatable airbag which is to be marked is formed by one-piece-weaving, a colored thread may be integrated into the weaving to form the landmark. The marks can be made by printing, stamping, melting, or contacting the material from which the inflatable airbag or modular component is manufactured with ink, chalk, graphite, wax, or any other suitable substance. Prior to inflatable airbag or modular component manufacture, the markings may be made on the fabric from which the airbag or modular component will be manufactured, and/or the marking may be made after manufacture of the airbag or modular component. Also, hardware such as templates or guides may be mounted to an assembly table or laid over the inflatable airbag to aid in proper location and orientation of the modular component. Additionally, a combination of landmarks and hardware may be employed to properly position and orient the modular component on the inflatable airbag.

An aperture in a modular component can be located at a predetermined position such that when the aperture is aligned with a landmark on an inflatable airbag or second modular component, the first modular component is properly aligned along at least one axis. For example, an aperture in a modular component can be aligned with a printed line on an inflatable airbag such that the line bisects the aperture. Since the aperture and the printed line are both in predetermined locations, after being fixedly coupled to the inflatable airbag, the modular component will be correctly positioned along an axis that is perpendicular to the printed line. Further, another mark can be added to the printed line, wherein the additional mark notes a target location for a modular component so that when an alignment aperture of the modular component is aligned with the marks, a "+" or "x" shape is visible within the aperture. If the landmark is located on one side or surface of the inflatable airbag or modular component, then the landmark may further define a position along the Z-axis at which the modular component is to be located. One skilled in the art will recognize that a variety of continuous and/or discrete marks can be utilized to identify target locations for modular components without departing from the spirit of the present disclosure. For instance, the "printed line" in the above example is a generic term for a "reference line" or "landmark", which may comprise a reference point that has been woven, sewn, or tool-controlled printed on the material from which the airbag is formed.

A plurality of mounting assemblies 120 may be employed to couple inflatable curtain airbag 110 to a vehicle. Mounting assembly 120 may comprise a mounting member 130, a wrapping member 140, and a connecting member (not visible). Mounting assembly 120 may be employed to couple airbag 110 adjacent to a vehicle roof rail 12 or other vehicle structure. As such, mounting assembly may be said to be a portion of an airbag assembly, which may comprise an inflatable curtain airbag and a mounting assembly. In the depicted embodiment, airbag 110 is an inflatable curtain airbag cushion, which extends from an A-pillar 14 to a D-pillar 19. Inflatable curtain airbag 110 also extends past a B-pillar 16 and a C-pillar 18 such that in a deployed configuration, the curtain airbag at least partially covers the B- and C-pillars, as depicted in FIG. 1B.

Figure 1B:
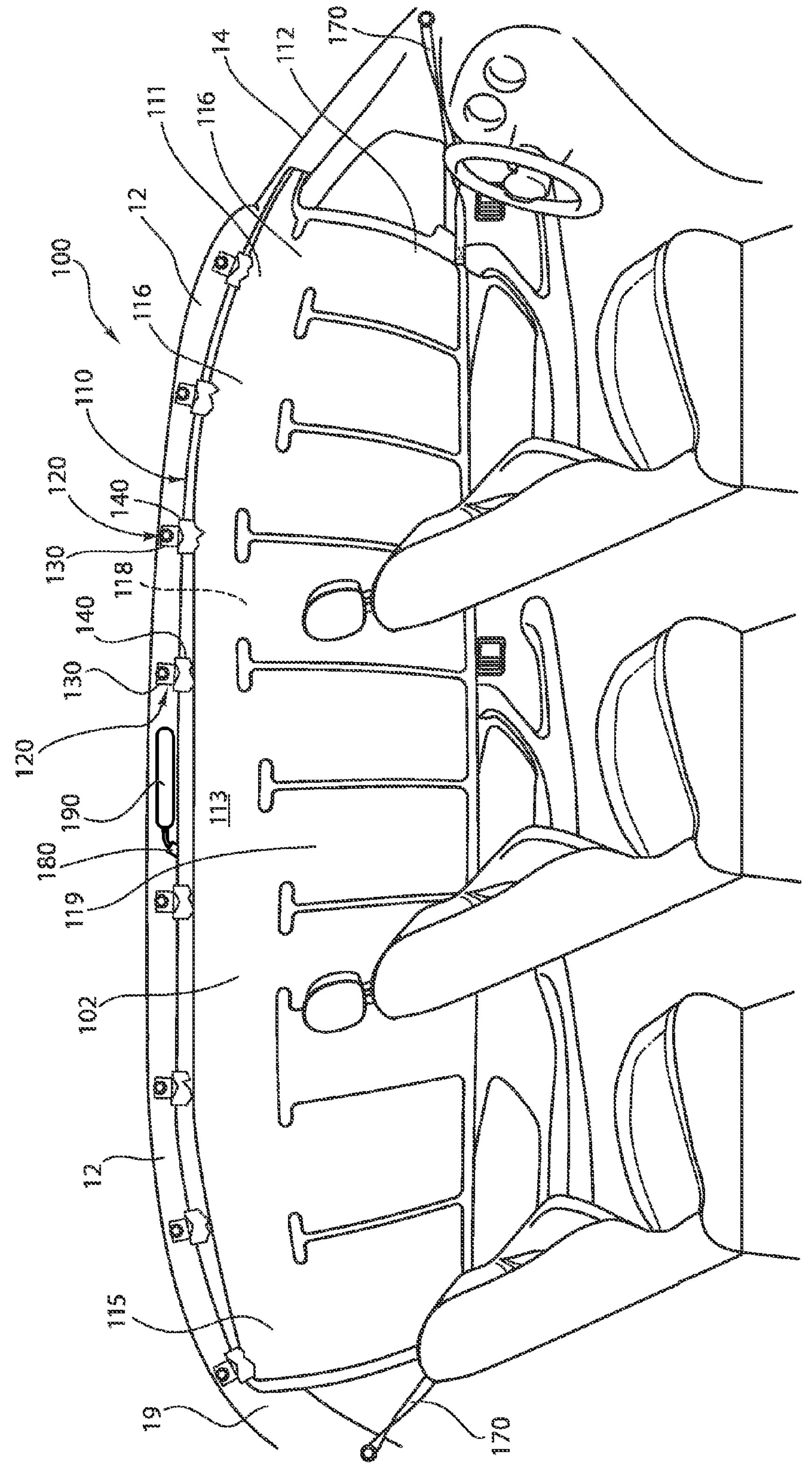
FIG. 1B is a perspective view of the airbag assembly of FIG. 1A, wherein the airbag is in a deployed configuration.

FIG. 1B is a perspective view of mounting assembly 120, wherein inflatable curtain airbag 110 is depicted in a deployed configuration. Inflatable curtain airbag 110 is configured to become inflated upon activation of one or more inflators such that the inflatable curtain airbag transitions from the packaged configuration to the deployed configuration. During deployment, wrapping member 140 is configured to rupture such that inflatable curtain airbag 110 can adopt the deployed configuration. Inflatable curtain airbag 110 may be described as having an upper portion 111, a lower portion 112, a first face 113, a second face (not visible) a first side 115, and a second side 116. The various faces of inflatable curtain airbag 110 define an interior inflatable void 118, which is in fluid communication with inflator 190. Inflatable void 118 may be divided into inflation cells 119. The various faces of inflatable curtain airbag 110 may comprise panels of a woven nylon fabric that are coupled together at a seam.

Upper portion 111 of inflatable curtain airbag 110 is the portion of the curtain airbag that is closest to the headliner of a vehicle when the airbag is in a deployed state. Lower portion 112 is below upper portion 111 when inflatable curtain airbag 110 is in a deployed state, and is closest to a floor of the vehicle. The term "lower portion" is not necessarily limited to the portion of inflatable curtain airbag 110 that is below a horizontal medial plane of the inflatable curtain airbag, but may include less than half, more than half or exactly half of the bottom portion of the inflatable curtain airbag. Likewise, the term "upper portion" is not necessarily limited to the portion of inflatable curtain airbag 110 that is above a horizontal medial plane of the inflatable curtain airbag, but may include less than half, more than half or exactly half of the top portion of the inflatable curtain airbag.

Upon activation, inflator 190 rapidly generates and/or releases inflation gas, which rapidly inflates the inflatable curtain airbag. The inflator may be one of several types, such as pyrotechnic, stored gas, or a combination inflator and may comprise a single or multistage inflator. As cushion 110 becomes inflated, tension is applied to wrapping member 140, which causes the wrapping member to cease to retain the inflatable curtain airbag in the packaged configuration. Tethers 170 are located outside inflatable curtain airbag 110, and in the deployed configuration, the tethers are configured to apply tension to the curtain airbag.

As will be appreciated by those skilled in the art, a variety of types and configurations of inflatable curtain airbag membranes can be utilized without departing from the scope and spirit of the present disclosure. For example, the size, shape, and proportions of the airbag membrane may vary according to its use in different vehicles or different locations within a vehicle such that the airbag may comprise an inflatable curtain cushion; a rear passenger side airbag; a driver's airbag; and/or a front passenger airbag. Also, the cushion membrane may comprise on or more of any material well known in the art, such as a woven nylon fabric. Additionally, the airbag cushion may be manufactured using a variety of techniques such as one piece weaving, cut and sew, or a combination of the two techniques. Further, the cushion membrane may be manufactured using sealed or unsealed seams, wherein the seams are formed by stitching, adhesive, taping, radio frequency welding, heat sealing, or any other suitable technique or combination of techniques.

Figure 2:
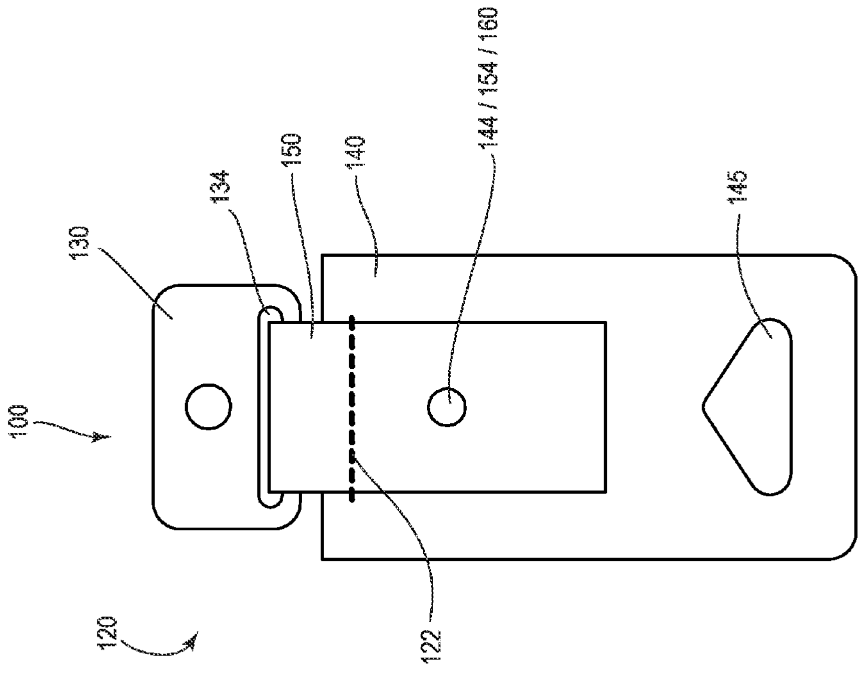
FIG. 2 is a rear elevation view of an inflatable curtain airbag mounting assembly, which is a component of the airbag assembly of FIG. 1A.

FIG. 2 is a rear elevation view of mounting assembly 120, which is a portion of inflatable curtain airbag assembly 100. Mounting member 130 may comprise a planar metal member or in other embodiments, a fabric, such as a woven nylon material. Mounting member 130 may have a receiving aperture 134 that can be configured as an elongated slot. If the mounting member comprises a fabric, the mounting member may not have a receiving aperture. Receiving aperture 134 is configured to receive connecting member 150. Connecting member 150 may comprise a non-frangible material, and is configured to interconnect mounting member 130 with an inflatable curtain airbag. Connecting member 150 has an alignment aperture 154 that is located at a predetermined location on the connecting member. Alignment aperture 154 can be used in conjunction with a landmark on the inflatable curtain airbag to locate mounting assembly 120 at a predetermined location.

Stitching 122 is configured to couple connecting member 150 to wrapping member 140. Wrapping member 140 may comprise a frangible material, or a non-frangible material that has a rupture point or any type of closure that is configured to release the wrapping member upon curtain airbag deployment. Wrapping member 140 comprises an opening 145 that is defined by a rim that is depicted as being triangular or pentagonal in shape. Wrapping member 140 has an alignment aperture 144 that is located at a predetermined location on the wrapping member. Alignment aperture 144 can be used in conjunction with a landmark on the inflatable curtain airbag to locate mounting assembly 120 at a predetermined location. Collectively, alignment apertures 144 and 154 may be called an alignment aperture 160. Alignment apertures 144 and 154 may each comprise a diameter within a range from about 3 mm to about 20 mm. In one embodiment, each of the alignment apertures has a diameter within a range of about 3 mm to about 9 mm. In another embodiment, each of the alignment apertures has a diameter of about 6 mm.

Alignment aperture 144 may be formed in wrapping member 140 before the wrapping member is coupled to connecting member 150. Likewise, alignment apertures 154 may be formed in connecting member 150 before the connecting member is coupled to wrapping member 140. If alignment apertures 144 and 154 are formed prior to wrapping member 140 and connecting member 150 being coupled together, then apertures 144 and 154 are formed at predetermined locations, such that the apertures will at least partially coincide when the wrapping and connecting members are coupled together. In another embodiment, the alignment apertures are formed in the wrapping member and the connecting member after the wrapping and connecting members are coupled together. Alternatively, the alignment aperture can be formed in either the wrapping member or the connecting member, and then after the wrapping and connecting members are coupled together, the alignment aperture can be formed in the member that did not have an alignment aperture before the members were coupled together. The overlapping alignment apertures form a "peep site," through which a landmark on the inflatable curtain airbag can be viewed.

One skilled in the art will recognize that a variety of configurations of mounting assemblies may be used without departing from the spirit of the present disclosure. For example, the mounting assembly may not have a wrapping member attached to the connecting member and/or mounting member. Further, the alignment apertures may not each have the same diameter or shape. Also, the alignment aperture(s) may be any suitable shape or size.

Figure 3:
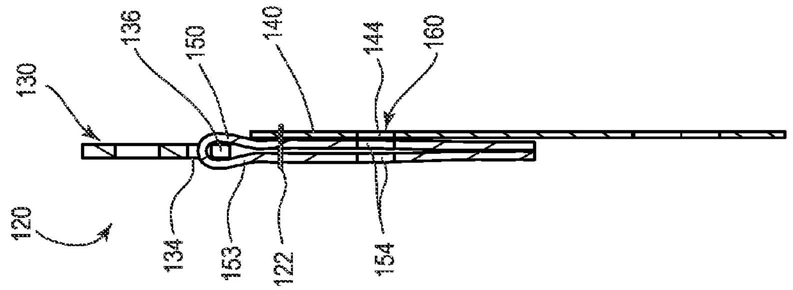
FIG. 3 is a cross-sectional view of the mounting assembly of FIG. 2.

FIG. 3 is a cross-sectional view of the mounting assembly 120 of FIG. 2. Mounting member 130 has a receiving aperture 134 that partially defines a bottom portion 136, which is configured to be captured by connecting member 150. Connecting member 150 is configured to be received by, and protrude through, receiving aperture 134. Connecting member 150 may comprise a rectangular piece of material that can be folded across its long axis to form a loop 153, which can surround bottom portion 136 of mounting member 130. Connecting member 150 may be coupled to itself via stitching 122, thereby fixedly attaching the connecting member to mounting member 130. Stitching 122 may also couple wrapping member 140 to connecting member 150. Alignment aperture 160 comprises alignment aperture 144 and alignment apertures 154. Alignment apertures 144 and 154 are located at predetermined locations and are configured to at least partially coincide.

Figure 4:
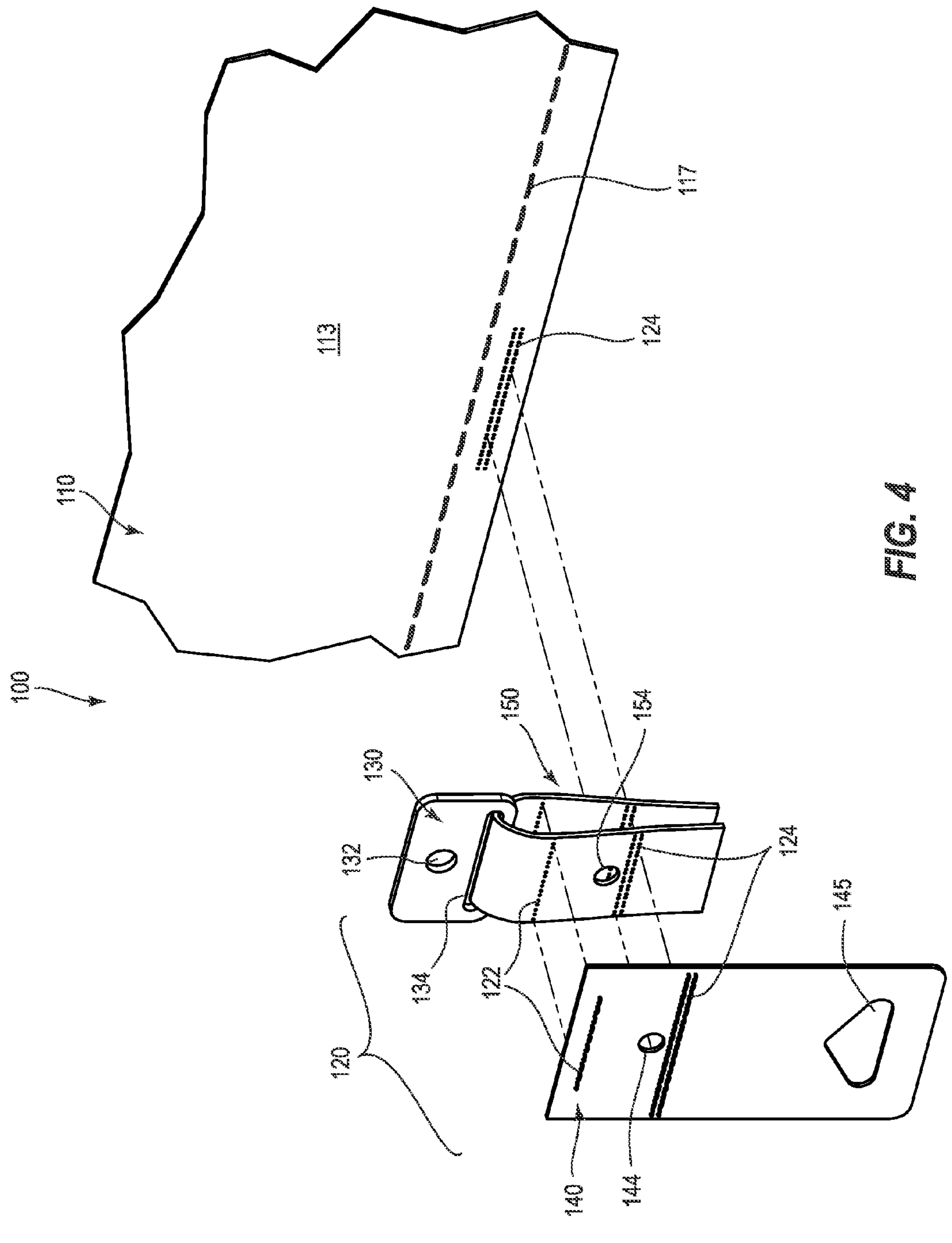
FIG. 4 is a partially exploded perspective view of the airbag assembly of FIG. 1A, wherein the airbag has been cutaway.

FIG. 4 is a front perspective view of a portion of inflatable curtain airbag assembly 100, in which airbag 110 is partially cutaway. Assembly 100 comprises inflatable curtain airbag 110 and mounting assembly 120, which may be considered a modular component of assembly 100. Mounting assembly 120 may comprise mounting member 130, wrapping member 140 and connecting member 150. Mounting member 130 may comprise a mounting aperture 132 and a receiving aperture

134. Connecting member 150 is configured to protrude through receiving aperture 134 and may be coupled to itself via stitching 122. Connecting member 150 comprises an alignment aperture 154. Wrapping member 140 may comprise a frangible material with an alignment aperture 144 and an opening 145. Wrapping member 140 is configured to be coupled to connecting member 150 via stitching 122.

Figure 5A:
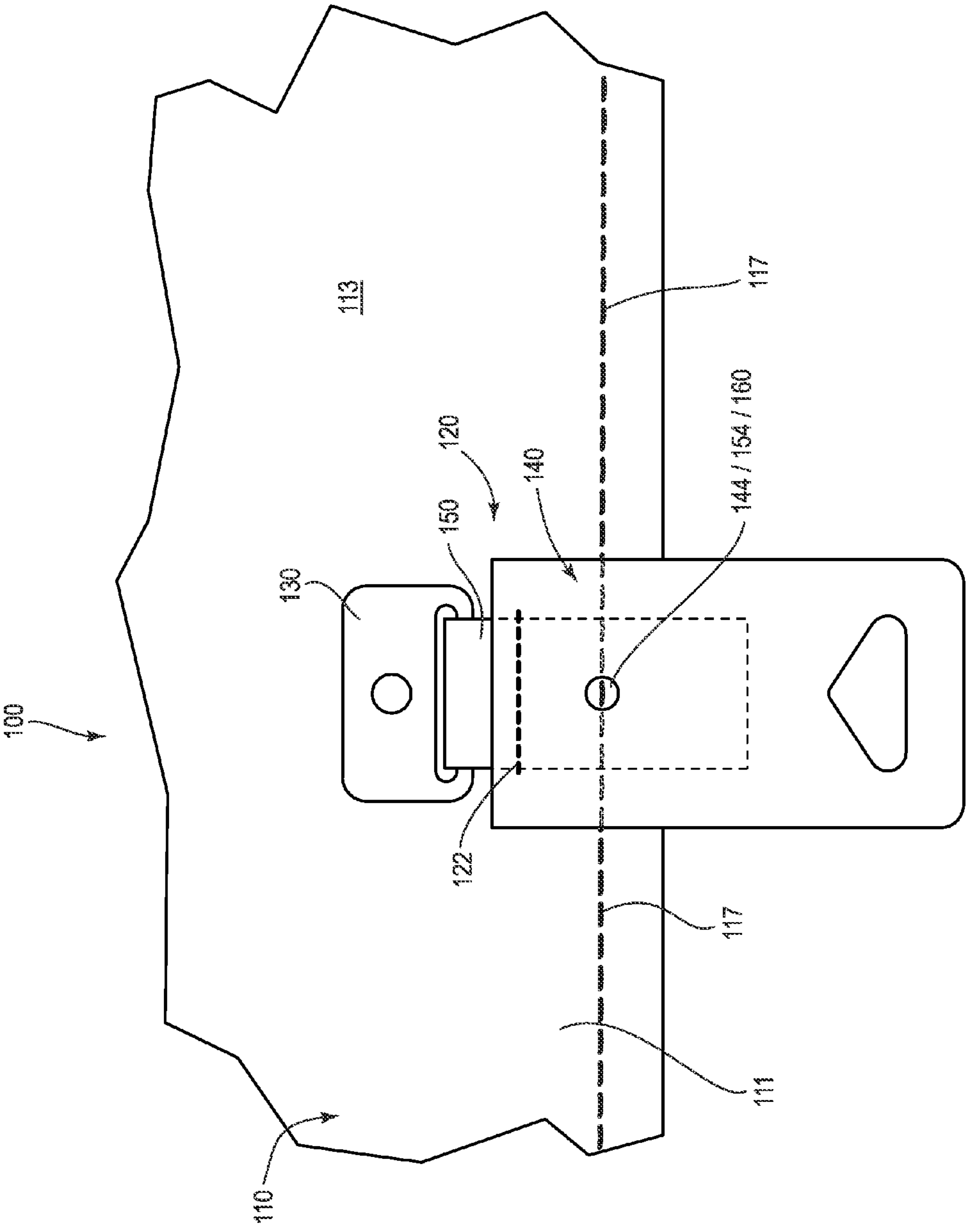
FIG. 5A is a cutaway front elevation view of the airbag assembly of FIG. 1, wherein the mounting assembly of FIG. 2 has been placed on the airbag, but has not yet been coupled to the airbag.
Figure 5B:
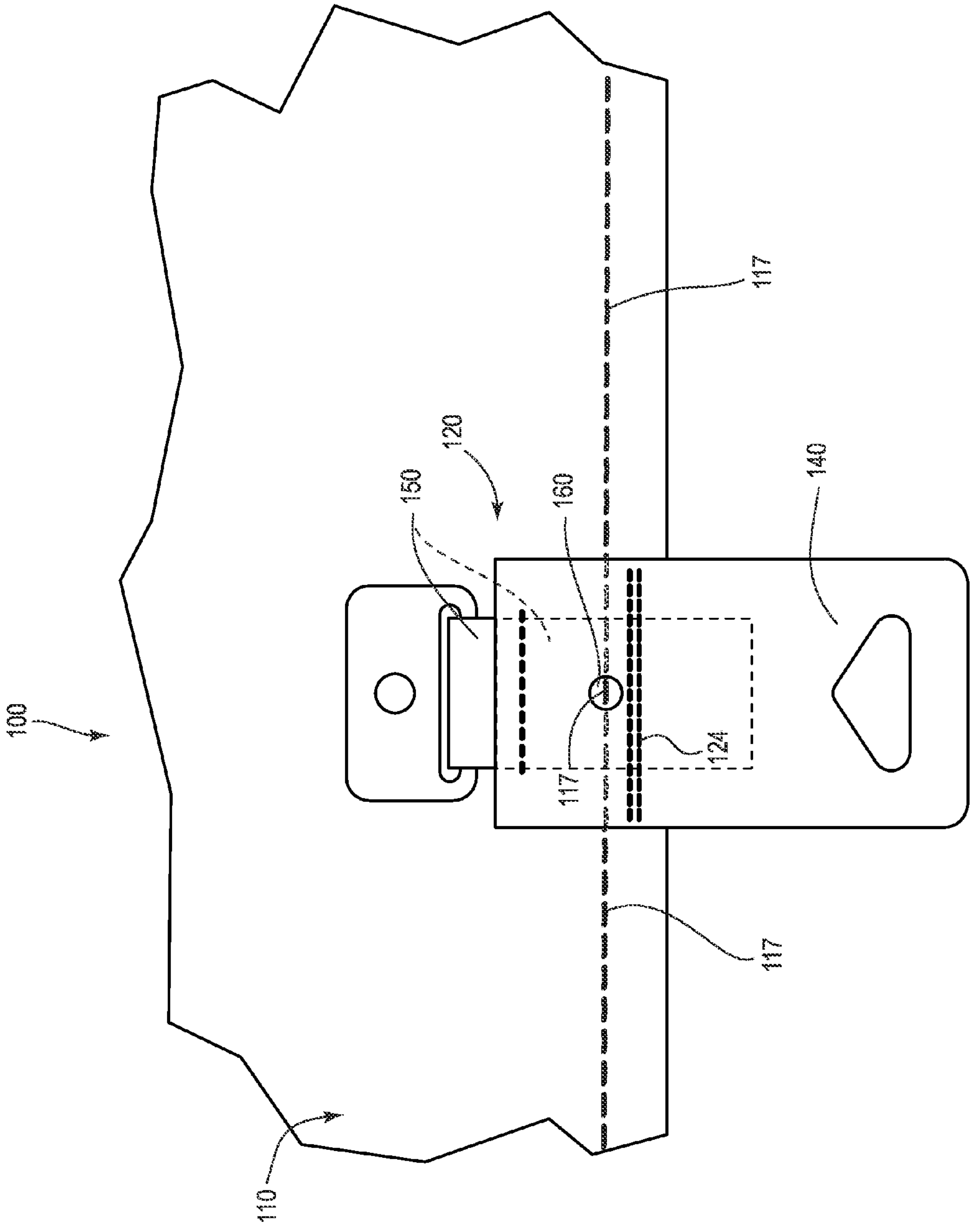
FIG. 5B is a cutaway front elevation view of the airbag assembly of FIG. 5A after the mounting assembly has been coupled to the airbag.

FIGS. 5A-5B depict assembly 100 from a front elevation view, wherein inflatable curtain airbag 110 is partially cutaway. Mounting assembly 120, comprising mounting member 130, wrapping member 140 and connecting member 150, has been assembled and is retained in the assembled state via stitching 122. Mounting assembly 120 is depicted as being placed on upper portion 111 of first face 113 of inflatable curtain airbag 110. Alignment apertures 144 and 154, formed in wrapping member 140 and connecting member 150 form alignment aperture 160. Apertures 144 and 154 are configured such that they form a contiguous aperture though which a landmark can at least partially be viewed, when the apertures are aligned with the landmark. In the depicted embodiment, stitching 117 serves as such a landmark, and can be seen through alignment aperture 160.

FIG. 5A depicts mounting assembly 120 before the mounting assembly has been attached to airbag 110. FIG. 5B depicts mounting assembly 120 after the mounting assembly has been attached to airbag 110 via stitching 124. Stitching 124 protrudes through wrapping member 140, connecting member 150, and inflatable curtain airbag 110. Stitching 124 couples airbag 110 to a vehicle structure via mounting assembly 120. Stitching 117 may still be visible through alignment aperture 160 after mounting assembly 120 is coupled to airbag 110. Additional hardware may be employed to assure that mounting assembly 120 is retained in a predetermined orientation until after stitching 124 attaches mounting assembly to airbag 110. For example, in the depiction of FIG. 5B, the long sides of wrapping member 140 appear to form approximately 90 degree angles with stitching 117, and the short sides of the wrapping member appear to be approximately parallel with seam 117. As such, the depicted location and positioning of mounting assembly 120 on airbag 110 may be said to define a predetermined orientation.

Figure 6:
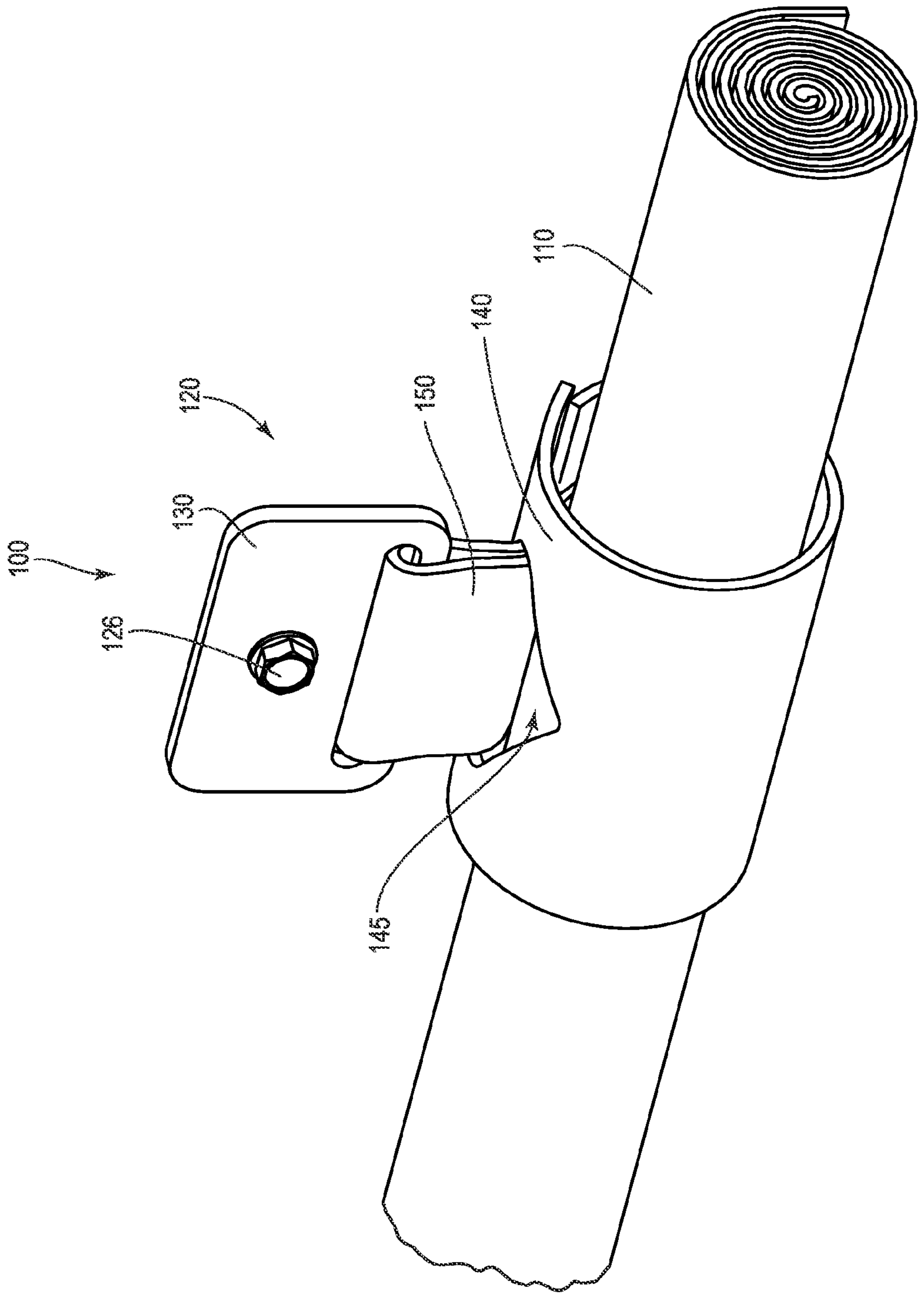
FIG. 6 is a close up front perspective view of the airbag assembly of FIG. 1A.
Figure 7:
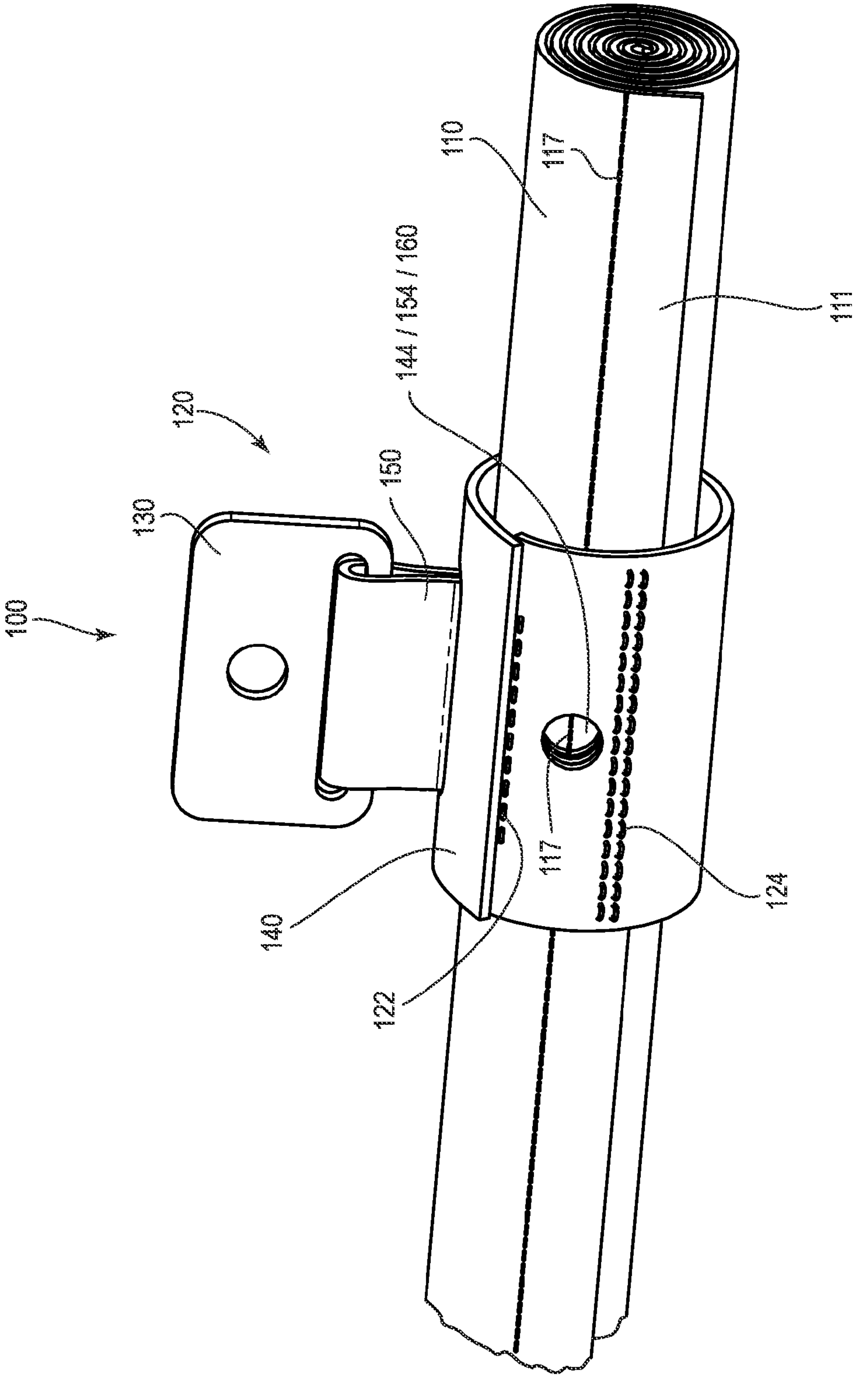
FIG. 7 is a close up rear perspective view of the airbag assembly of FIG. 1A.

FIGS. 6-7 are front and rear perspective views of a portion of inflatable curtain airbag assembly 100, wherein mounting assembly 120 has been coupled to inflatable curtain air bag 110 and wrapping member 140 is retaining airbag 110 in a packaged configuration. Opening 145 of wrapping member 140 has been placed over mounting member 130 and a portion of connecting member 150. FIG. 6 depicts a bolt 126 protruding through the mounting aperture of mounting member 130. Bolt 126 may be employed to couple mounting assembly 120 to a vehicle structure. FIG. 7 depicts upper portion 111 of airbag 110, wherein stitching 124 couples the upper portion of the airbag to mounting assembly 120. Stitching 117 is visible through alignment apertures 144 and 154, which define alignment aperture 160. Also visible is stitching 122, which couples mounting member 130, wrapping member 140, and connecting member 150.

Figure 8:
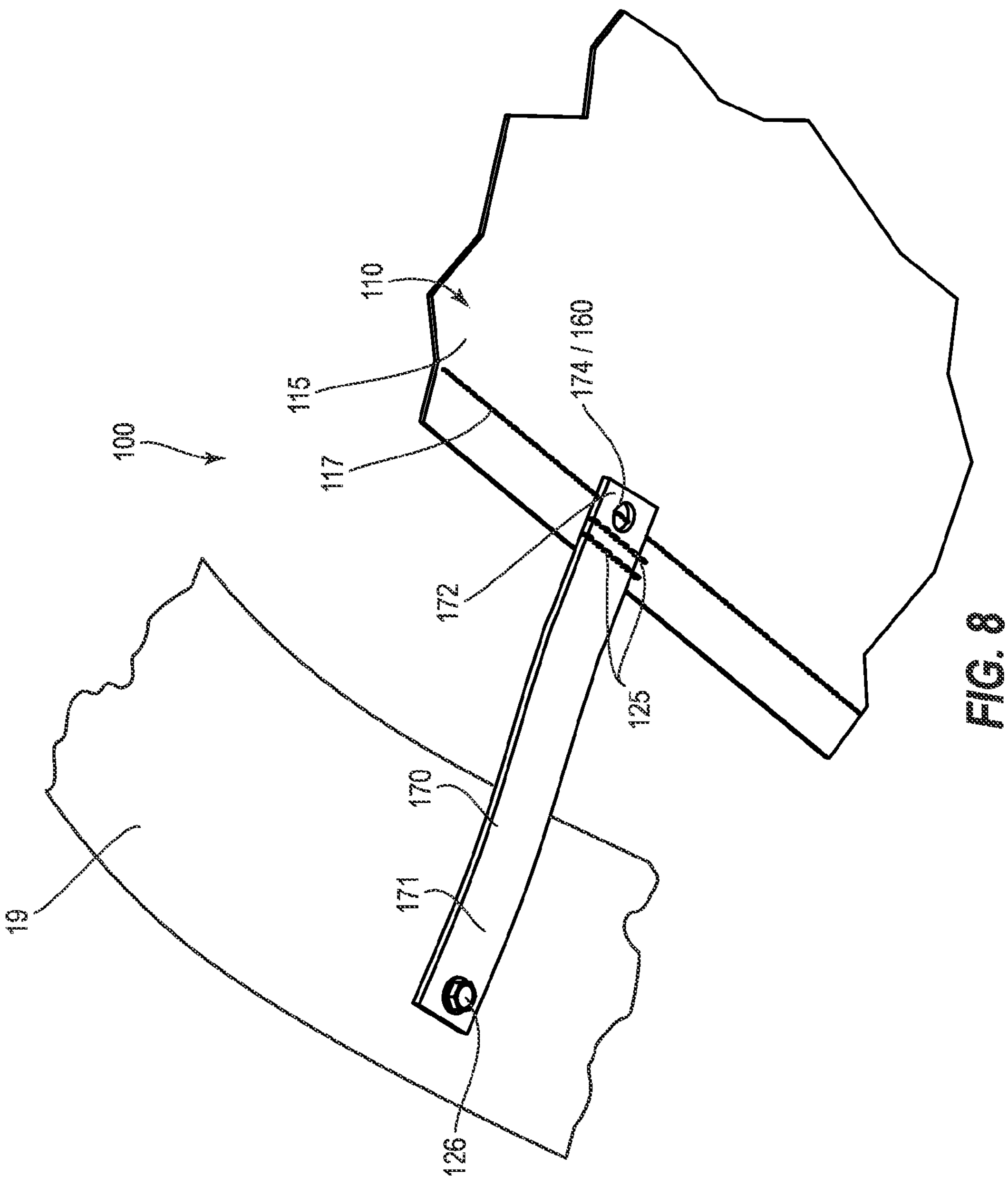
FIG. 8 is another embodiment of a modular component of an inflatable curtain airbag, wherein the modular component has an alignment aperture.

FIGS. 1A-1B and FIG. 8 depict another embodiment of an airbag assembly modular component with an alignment aperture. FIG. 8 is a perspective view of another portion of inflatable curtain airbag assembly 100. In the depicted embodiment, a tether 170 comprises a modular component of inflatable curtain airbag assembly 100. Tether 170 may be considered a tether assembly, wherein the tether assembly comprises a tether 170 and a mounting member 126. The tether assembly may further comprise a mounting bracket. Inflatable curtain airbag assembly 100 may comprise one or more tethers or tether assemblies. External tethers may be employed to tension inflatable curtain airbag 110 when the airbag is in a deployed configuration, as such, the airbag may be coupled to a vehicle structure, such as D-pillar 19, via tether 170. Tether 170 may comprise an elongated piece of woven nylon material that has a first portion 171 and a second portion 172. First portion 171 may be configured to receive mounting member 126. Second portion 172 comprises an alignment aperture 174, which may be the same or a different embodiment of alignment aperture 160. Alignment aperture 174 may function as other alignment apertures described herein, such that when properly positioned on inflatable curtain airbag 110, a portion of stitching 117 may be visible through the alignment aperture 174. Second portion 172 may be coupled to a side of inflatable curtain airbag 110, such as first side 115, via stitching 125. Tether 170 comprises a predetermined length, such that in a deployed state, inflatable curtain airbag has a predetermined tension.

Figure 9:
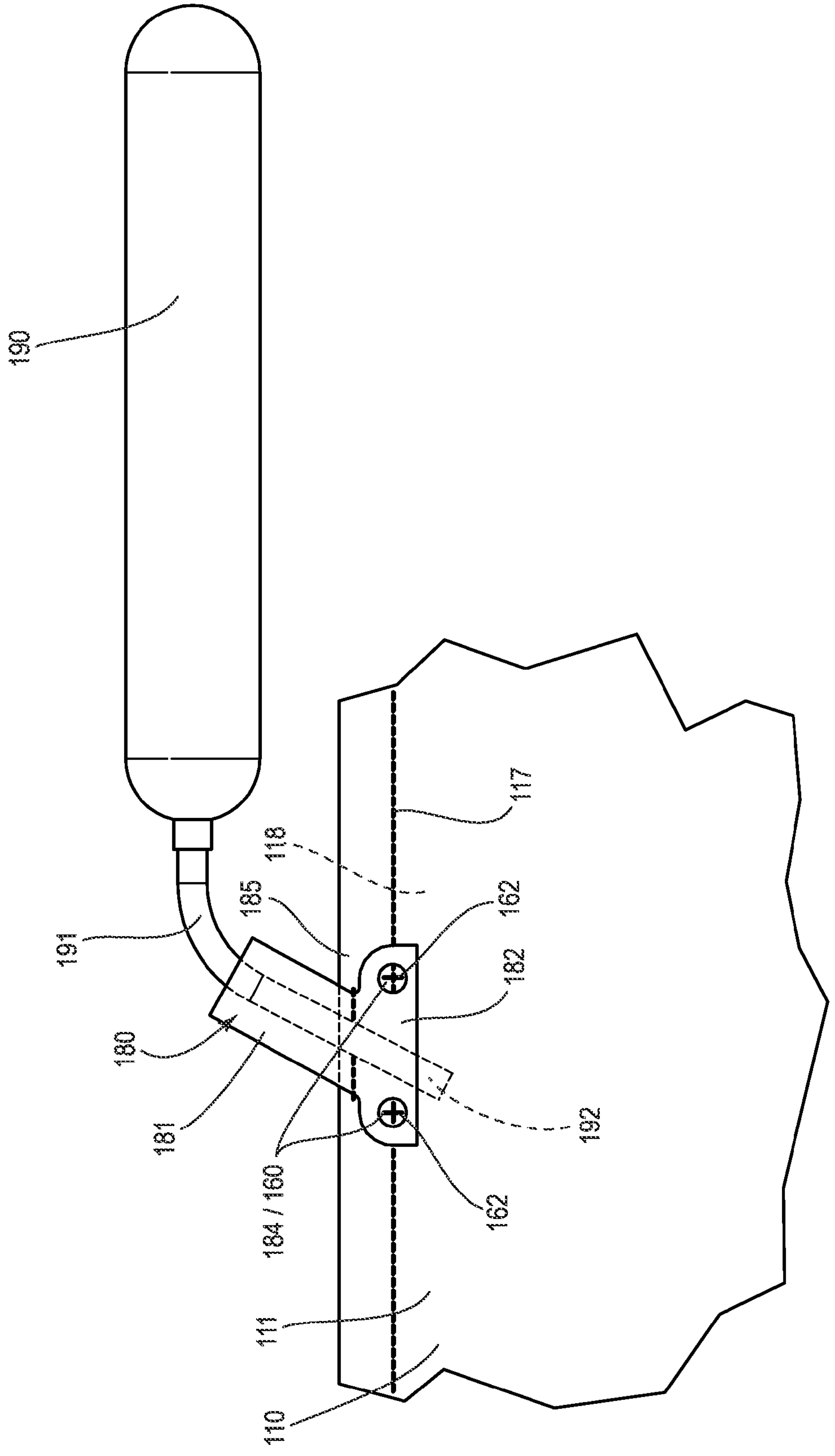
FIG. 9 is another embodiment of a modular component of an inflatable curtain airbag, wherein the modular component has an alignment aperture.

FIGS. 1A-1B and FIG. 9 depict another embodiment of an airbag assembly modular component with an alignment aperture. FIG. 9 is a perspective view of another portion of inflatable curtain airbag assembly 100. In the depicted embodiment, a fill tube 180 comprises a modular component of inflatable curtain airbag assembly 100. Fill tube 180 may be located at upper portion 111 of inflatable curtain airbag 110 and may be employed to couple an inflator 190 with inflatable void 118 of the airbag.

Inflator 190 may comprise an inflator tube 191 that projects into inflatable void 118. Inflator tube 191 may have a diffuser 192. Inflator tube 191 and/or diffuser 192 protrude through a gap in stitching 117 that couple together the two layers of material that define the front and rear faces of inflatable curtain airbag 110, which in turn, partially define inflatable void 118. Likewise, fill tube 180 may comprise two layers of material, which are coupled together at a top portion 181 of the fill tube. Top portion 181 may comprise an open end, such that inflator tube 191 can protrude into the fill tube. The layers of material may not be coupled together at bottom portion 182 such that each of the two layers of fill tube material can be placed outside inflatable curtain airbag 110. Bottom portion 182 comprises alignment apertures 184, which may be called alignment apertures 160, as described herein.

A location of inflator 190 along a vehicle roof rail and a total length of inflator tube 191 may be predetermined, in which case, if inflatable curtain airbag 110 is to assume a predetermined position within the vehicle, then fill tube 180 may be located at a predetermined position on the airbag. As such, more than one landmark on inflatable curtain airbag 110 may be employed to position fill tube 180 at the predetermined location so that the fill tube is correctly positioned vertically and longitudinally on the airbag. As described herein, stitching 117 may be employed as a landmark to be identified by viewing through alignment aperture 184. In addition, a second landmark 162 may be employed, wherein the second landmark comprises a mark formed by inking or printing inflatable curtain airbag 110. Once correctly positioned and oriented at the predetermined location, fill tube 180 may be coupled to inflatable curtain airbag 110 via stitching 185.

Figure 10:
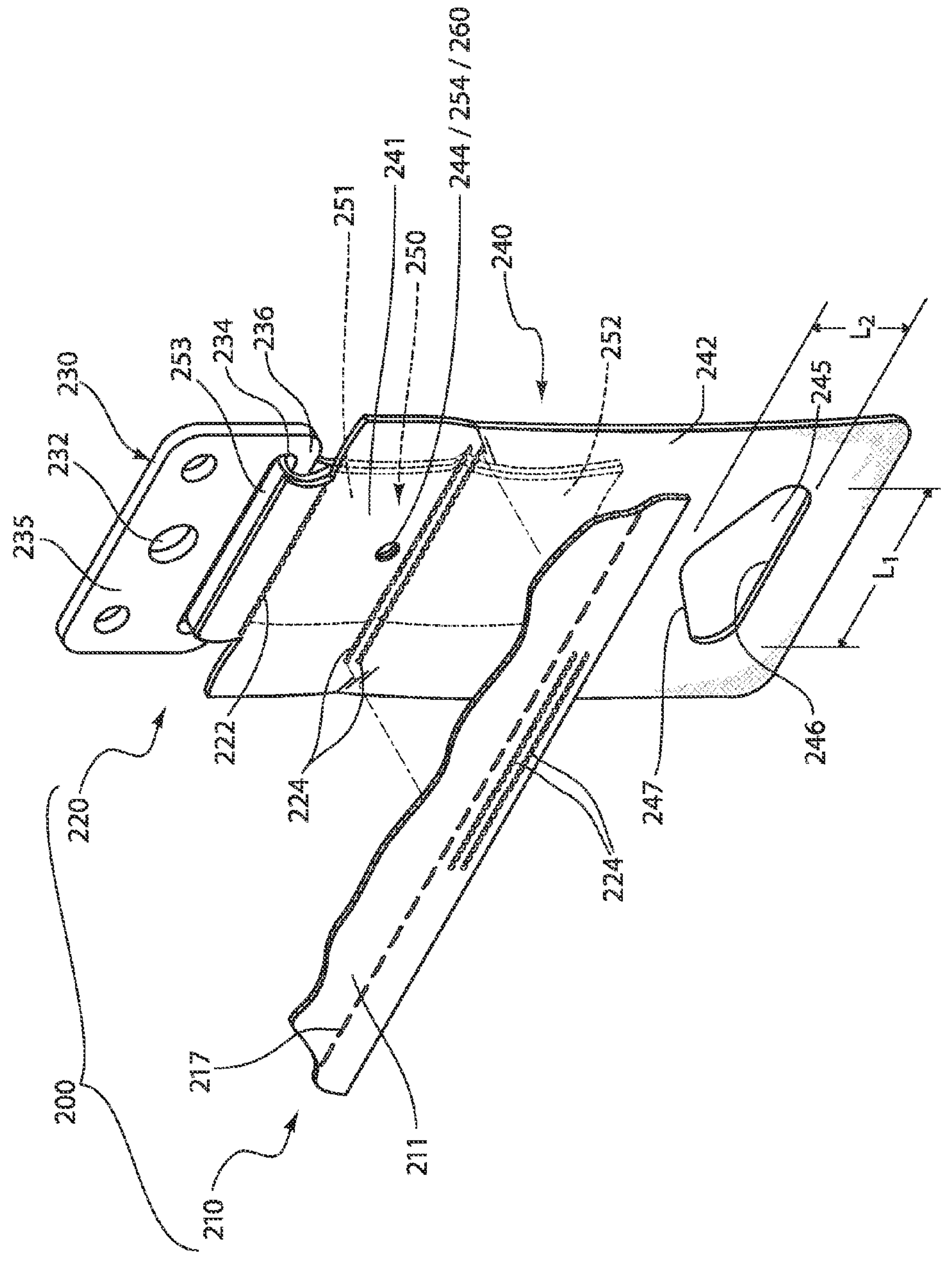
FIG. 10 is a partially exploded perspective view of another embodiment of an airbag assembly, wherein the airbag has been cutaway.

FIG. 10 depicts another embodiment of an airbag assembly 200 from a partially exploded perspective view in which inflatable curtain airbag 210 is partially cutaway. Assembly 200 may be configured similarly and may function similarly as assembly 100, in many respects; therefore, like features are identified with like reference numerals, with a leading hundreds numeral incremented to the value "2". Specifically, airbag assembly 200 may be configured similarly and may function similarly as airbag assembly 100. Disclosure in regard to assembly 200 that is compatible with assembly 100, but is not included in the above description of assembly 100, can be considered applicable to assembly 100.

Mounting assembly 220 may comprise mounting member 230, wrapping member 240, and a connecting member 250. Mounting member 230 may comprise a top portion 235 and a bottom portion 236; the mounting member may also comprise a mounting aperture 232 that is located on the top portion, and a receiving aperture 234 that is located nearer the bottom portion than the mounting aperture. Mounting aperture 232 is configured to receive a fastener, such as a mounting structure coupled to the vehicle, or a bolt. Receiving aperture 234 is configured to receive connecting member 250. Receiving aperture 234 may be described as an elongated slot. One skilled in the art will recognize that the mounting member may comprise more or fewer apertures than described herein. For example, in one embodiment, the mounting member comprises two mounting apertures, and in another embodiment, the mounting member comprises three mounting apertures. Further, the location of the apertures may vary from the depiction of FIG. 10.

Wrapping member 240 may comprise a substantially elongated piece of a material that has a first portion 241 and a second portion 242. The material of wrapping member 240 may comprise a non-woven nylon frangible material, a non-woven polyester frangible material, a non-frangible material that has a rupture point or a closure mechanism or material that is configured to fail during inflatable curtain airbag 210 deployment. First portion 241 may be coupled to connecting member 250 via stitching 222. First portion 241 may also be coupled to inflatable curtain airbag 210 via stitching 224.

Second portion 242 of wrapping member 240 may comprise an opening 245. Opening 245 is configured to allow second portion 242 of wrapping member 240 to fit over mounting member 230 and thereby retain an airbag cushion in a rolled and/or folded configuration. As such, a total length of wrapping member 240 is of a predetermined magnitude. In the depicted embodiment, opening 245 comprises a triangular shape that has a base 246 and an apex 247, wherein a length $L_1$ of the base may be from about 30 mm to about 50 mm and a length $L_2$ from base 246 to apex 247 may be from about 10 mm to about 30 mm. One skilled in the art will recognize that the dimensions of the aperture may be varied for use with different sized mounting members.

In the depicted embodiment, a total width of wrapping member 140, as measured parallel with base, 246 may be from about 50 mm to about 80 mm; however, as one skilled in the art will recognize, the total width of the wrapping member may be varied for use with different sized mounting members and/or so that the wrapping member will rupture when exposed to a predetermined magnitude of tension. Opening 245 may comprise a cutout portion of wrapping member 240. One skilled in the art will recognize that the shape and dimensions of the wrapping member and opening may vary from the depicted embodiment and associated description without departing from the spirit of this disclosure.

Connecting member 250 may comprise a non-frangible material, such as a woven nylon material, or any other suitable material that is known in the art. Connecting member 250 is configured to be received by, and protrude through, receiving aperture 234. Connecting member 250 may comprise a rectangular piece of material that can be folded over to form a loop 253, which can surround bottom portion 236 of mounting member 230. First portion 251 may be coupled to itself to fixedly attach connecting member 250 to mounting member 230 via loop 253. First portion 251 may be coupled to itself via stitching 222. Connecting member 250 may be coupled to inflatable curtain airbag 210 via stitching 224.

For clarity, airbag 210 is partially cutaway in FIG. 10. Top portion 211 of airbag 210 may be coupled to mounting assembly 220 at first portion 241 of wrapping member 240. Inflatable curtain airbag 210 may be coupled to the assembly at a non-inflatable portion, such as the area outside of seam 217. The inflatable curtain airbag may be coupled to mounting assembly 220 via stitching 224, which may comprise a separate set of stitching than stitching 222. During manufacture, mounting assembly 220 may be produced independent of inflatable curtain 210 such that the inflatable curtain airbag is coupled to mounting assembly 220 after the mounting assembly has been produced. As such, mounting assembly 220 may be described as being a sub-assembly 220 of inflatable curtain airbag assembly 200.

Figure 11A:
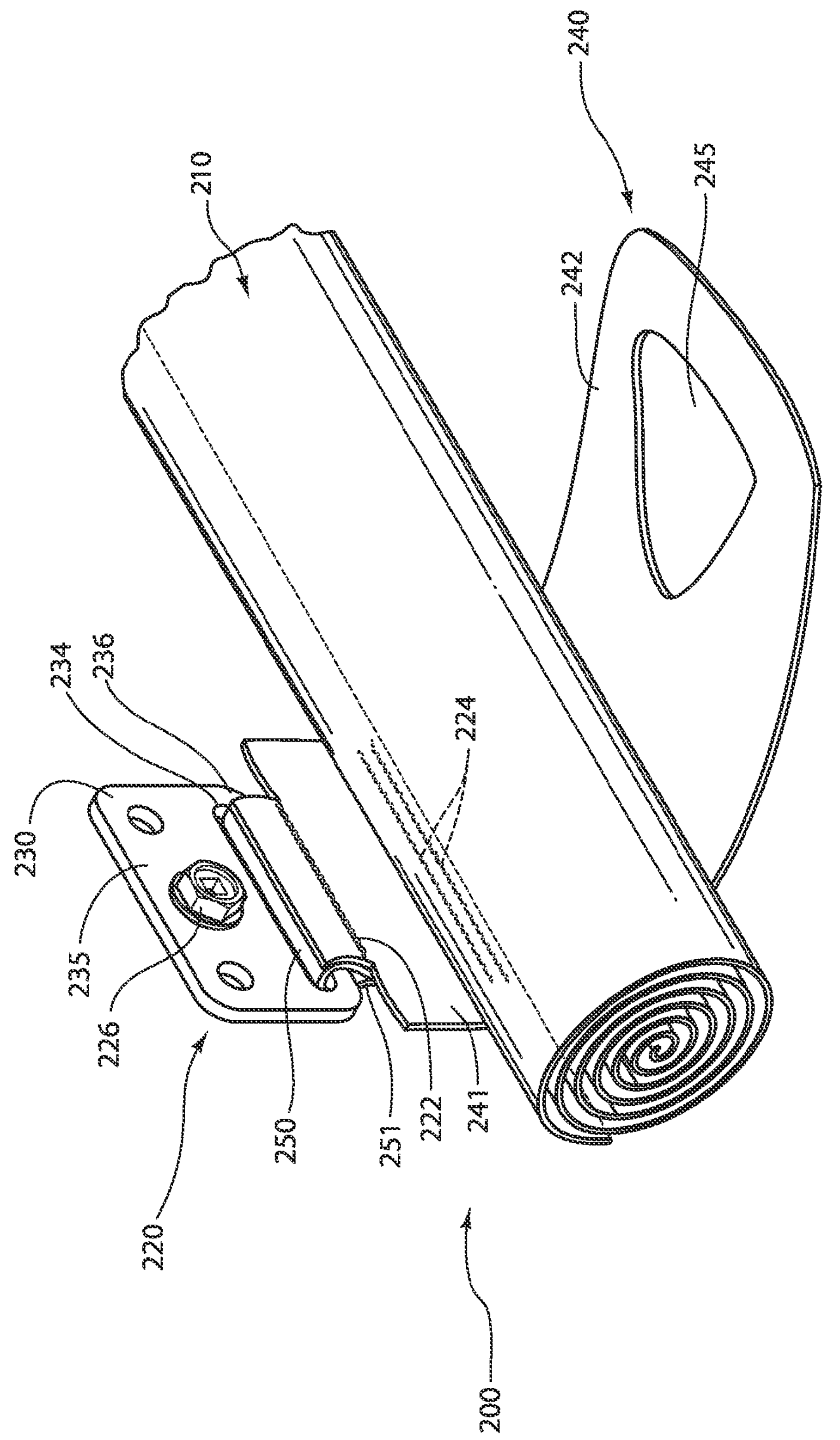
FIG. 11A is a cutaway perspective view of the airbag assembly of FIG. 10, wherein the airbag has been rolled, but has not yet been wrapped.

FIG. 11A is a perspective view of airbag assembly 200, wherein inflatable curtain airbag 210 has been partially cutaway. In the depiction of FIG. 11A, inflatable curtain airbag 210 is in a rolled configuration and has been coupled to mounting assembly 220 at first portion 241 of wrapping member 240 via stitching 224. In the rolled configuration, inflatable curtain airbag 210 comprises an outside surface, which may be circular or oval in shape, when viewed from an end. Mounting member 230 is depicted as having a bolt 226 projecting into and through the mounting member mounting aperture, which is located on top portion 235 of the mounting member. Receiving aperture 234 is located on bottom portion 236 of mounting member 230 and is depicted as having received first portion 251 of the connecting member 250. Stitching 222 couples first portion 251 to itself such that the connecting member is attached to mounting member 230. Wrapping member 240 may be coupled to connecting member 250 at first portion 241 of the wrapping member via stitching 222. Also, wrapping member 240 may be coupled to inflatable curtain airbag 210 via stitching 224. Second portion 242 of connecting member 240 comprises an opening 245.

Figure 11B:
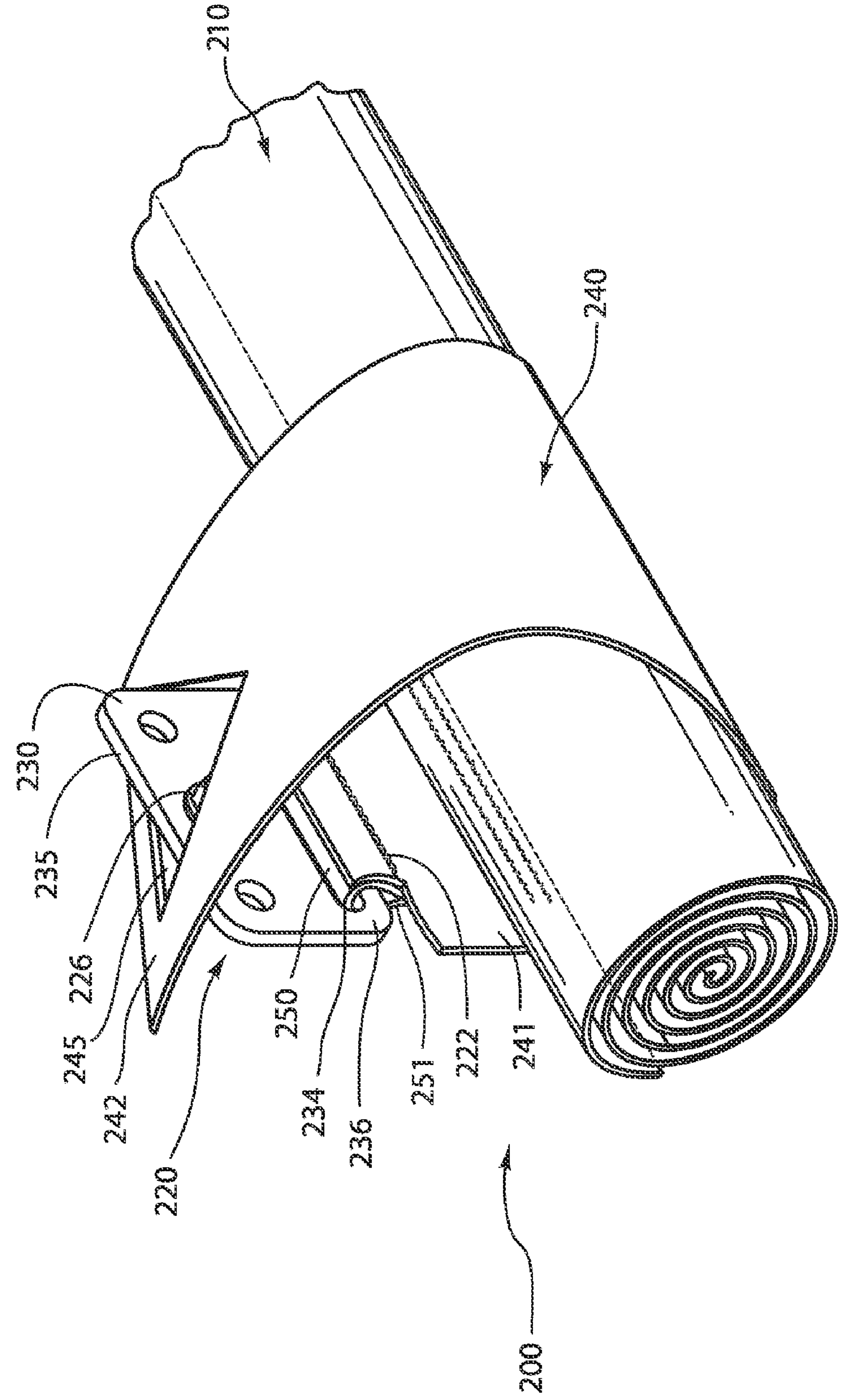
FIG. 11B is a cutaway perspective view of the airbag assembly of FIG. 11A, wherein a wrapping member of the mounting assembly is being wrapped around the airbag.

FIG. 11B is a cutaway perspective view of airbag assembly 200 of FIG. 11A after wrapping member 240 has been wrapped around inflatable curtain airbag 210 and is being coupled to mounting member 230. Second portion 242 of wrapping member 240 may be directed toward mounting member 230 such that inflatable curtain airbag 210 is wrapped. Opening 245 is configured to fit over mounting member 230, and in the depiction of FIG. 11B, the opening has partially received top portion 235 of the mounting member. To fully receive mounting member 230, second portion 242 may continue to be directed toward bottom portion 236 of the mounting member, first portion 251 of connecting member 250, and first portion 241 of the wrapping member.

Figure 11C:
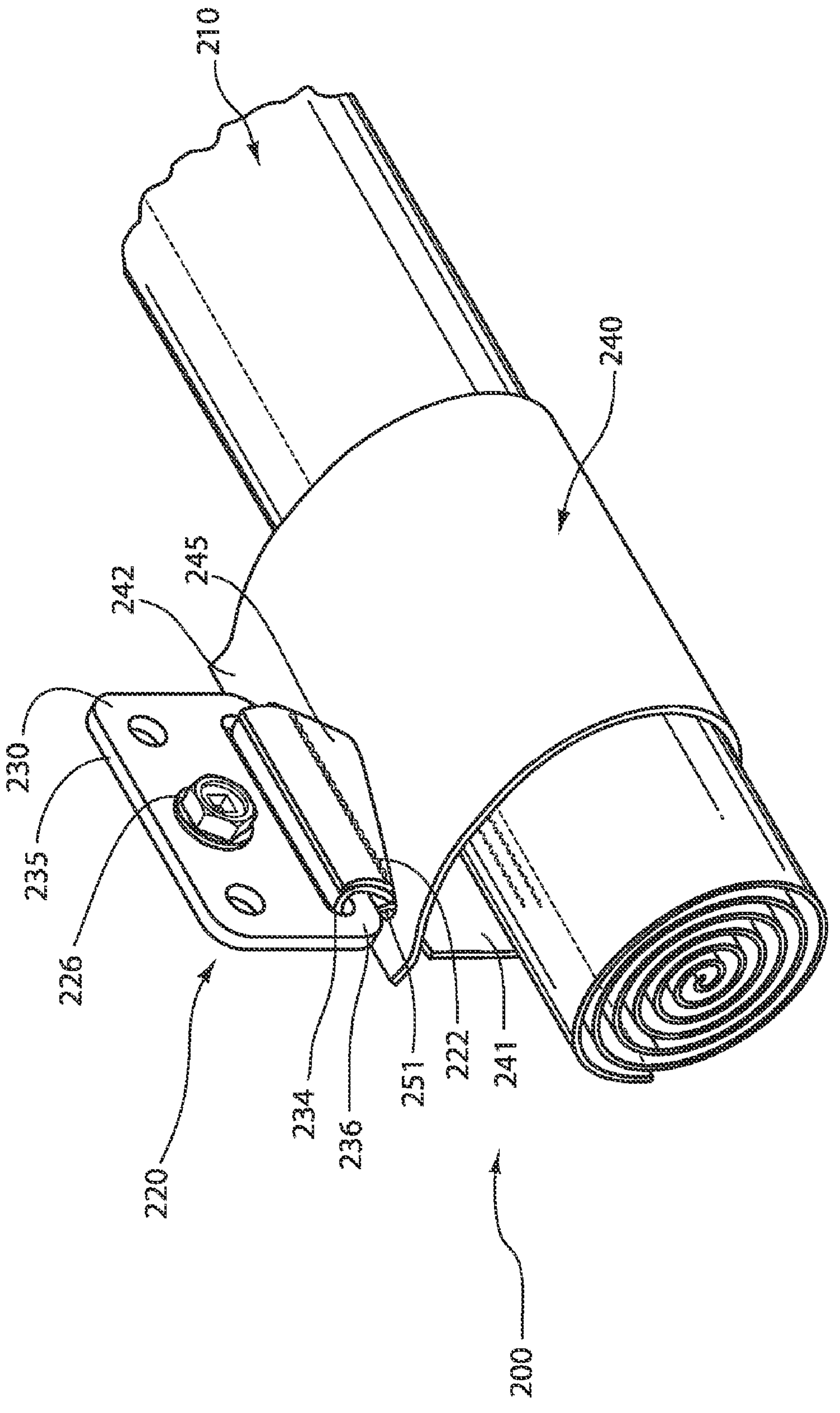
FIG. 11C is a cutaway perspective view of the airbag assembly of FIG. 11B, wherein the airbag has been wrapped by a wrapping member.

FIG. 11C is a cutaway perspective view of airbag assembly 200 of FIG. 11B after inflatable curtain airbag 210 has been wrapped and retained in a rolled and/or folded configuration such that the inflatable curtain airbag comprises a packaged configuration. Opening 245 of second portion 242 has fully received mounting member 230 and has been positioned between bottom portion 236 of the mounting member. Opening 245 also partially receives first portion 251 of the connecting member. As such, first and second portions 241 and 242 have been coupled adjacent to each other and wrapping member 240 may be said to be wrapping inflatable curtain airbag 210. Also, wrapping member 240 may be said to circumnavigate inflatable curtain airbag 210. During airbag deployment, the inflatable curtain airbag may become partially inflated, which may transmit tension to the wrapping member such that the wrapping member ruptures.

Figure 12B:
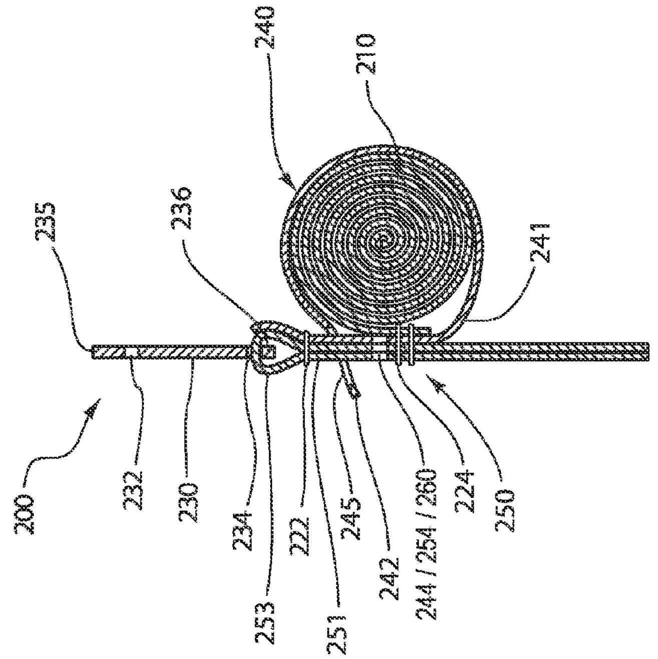
FIG. 12B is a cross sectional view of the airbag assembly of FIG. 12A after the airbag has been rolled and wrapped.
Figure 12A:
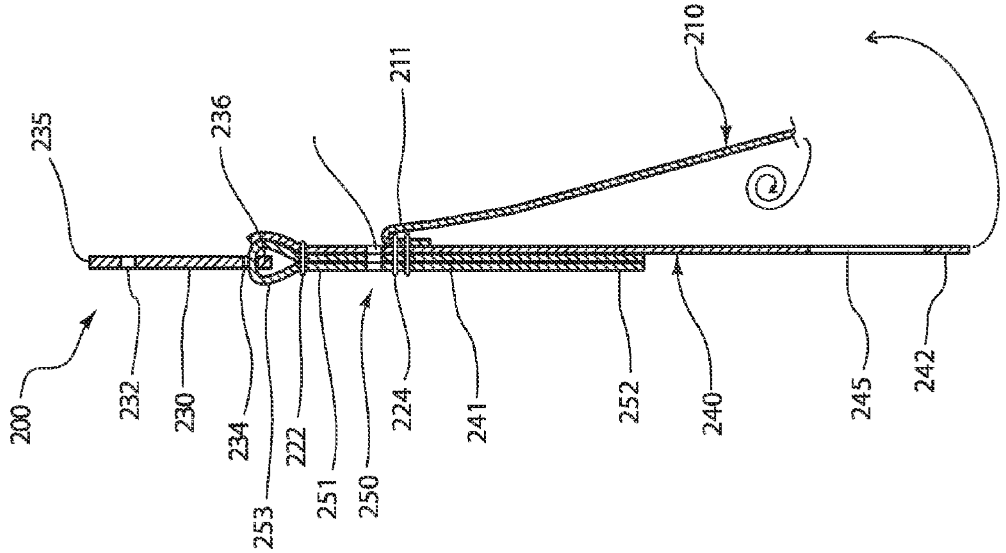
FIG. 12A is a cross sectional view of the airbag assembly of FIG. 10 before the airbag has been rolled and wrapped.

FIGS. 12A and 12B are cross sectional views of airbag assembly 200, wherein FIG. 12A depicts the assembly before the inflatable curtain airbag has been rolled and wrapped and FIG. 12B depicts the assembly in the packaged configuration. Mounting member 230 comprises top portion, which has mounting aperture 232, and bottom portion 236, which has receiving aperture 234. Upper portion 211 of inflatable curtain airbag 210 is coupled to first portion 241 of wrapping member 240 via stitching 224. First and second portions 251 and 252 of connecting member 250 may comprise two layers of material. First portion 251 is depicted as forming a loop 253 that is closed via stitching 222, such that connecting member 250 is attached to mounting member 230.

In the depiction of FIG. 12A, inflatable curtain airbag 210 is in an extended non-deployed configuration such as during manufacture and incorporation into an airbag assembly. Wrapping member 240 is also in an extended configuration, wherein second portion 242 is not adjacent to first portion 241 and opening 245 is not placed over mounting member 230.

In the depiction of FIG. 12B, airbag assembly 200 is in the packaged configuration. Wrapping member 240 has been wrapped around an outer surface of rolled inflatable curtain airbag 210 and opening 245 in second portion 242 has been placed over mounting member 230, loop 253 of first portion 251 of connecting member 250, and first portion 241 of the wrapping member. As such, the inflatable curtain airbag is retained in the rolled configuration via wrapping member 240. Opening 245 may be located between bottom portion 236 of mounting member 230 and stitching 224. Second portion 242 is adjacent to first portion 241 and surrounds first portion 251 of connecting member 250.

Figure 13B:
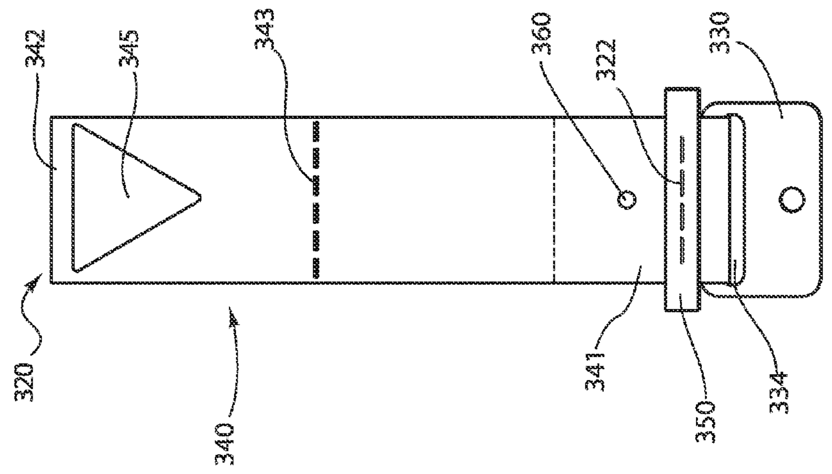
FIG. 13B is a front elevation view of the mounting assembly of FIG. 13A after the mounting assembly has been assembled.
Figure 13A:
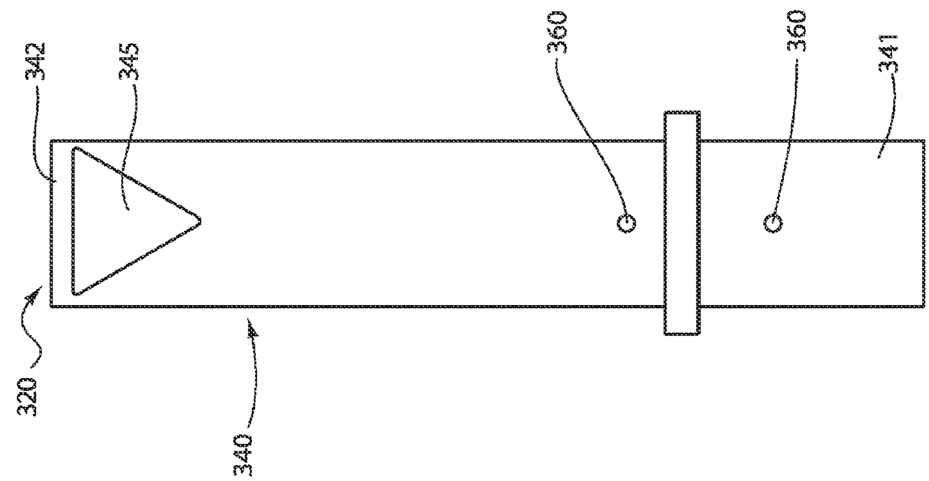
FIG. 13A is a front elevation view of another embodiment of a mounting assembly, wherein the mounting assembly has not yet been assembled.

FIGS. 13A-13B depict another embodiment of a mounting assembly 320, wherein FIG. 13A depicts some components of the assembly during manufacture and FIG. 13B depicts the assembly after manufacture. Mounting assembly 320 may function similarly as assemblies 120 and 220, in many respects, thus like features are identified with like reference numerals, with a leading hundreds numeral incremented to the value "3". In the depicted embodiment, assembly 320 does not comprise a separate connecting member and wrapping member. Instead, wrapping member 340 comprises a connecting member. Wrapping member 340 comprises a non-frangible material that is rendered frangible via a rupture point 343, as depicted in FIG. 13B. First portion 341 of wrapping member 340 may comprise a greater length than a finished length, wherein the first portion can be folded one or more times to achieve the finished length. During manufacture, first portion 341 may be threaded through receiving aperture 334 of mounting member 330, folded over the mounting member, and sewn together via stitching 322.

Prior to sewing, a lug 350 may be placed between the layers of the folded wrapping member, or alternatively, the lug may be sewn on the outside of the wrapping member, rather than between the wrapping member layers. Lug 350 may comprise one or more pieces of fabric or other material. In the depicted embodiment, lug 350 comprises a piece of material that is separate from wrapping member 340 and is coupled to the wrapping member via stitching 322. In another embodiment, the lug comprises an extension of wrapping member 340. Lug 350 is located in a predetermined position such that when assembly 320 is in a packaged configuration with an inflatable curtain airbag, opening 345 is located between lug 350 and mounting member 330. Lug 350 prevents wrapping member 340 from tightening or "creeping" on the airbag. As such, the lug may be described as acting as a "stop".

Prior to, or after mounting member 330 and lug 350 are coupled to wrapping member 340, perforations 343 may be formed in the wrapping member to form the rupture point 343. Likewise, prior to or after the steps described herein, opening 345 may be formed in second portion 342. Mounting assembly 320, as depicted in FIG. 13B, may be described as comprising a sub-assembly, wherein in the depiction, the sub-assembly is ready to be coupled to an inflatable airbag inflatable curtain airbag. Mounting assembly 320 is configured to function similarly to mounting assemblies 120 and 220, described herein. Opening 345 is configured to function similarly as openings 145 and 245, described herein, such that it may fit over mounting member 330 and thereby retain an inflatable curtain airbag assembly in a packaged configuration.

Figure 14:
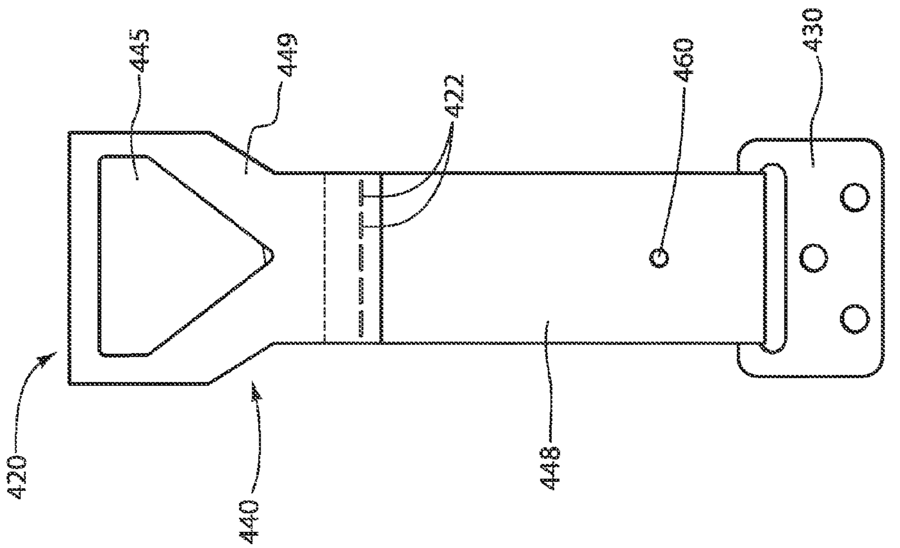
FIG. 14 is a front elevation view of another embodiment of an airbag mounting assembly having an alignment aperture.

FIG. 14 depicts another embodiment of a mounting assembly 420 from a front elevation view. Assembly 420 may be configured similarly and may function similarly as assemblies 120, 220, and 320 described herein. Assembly 420 may comprise a mounting member 430 and a wrapping member 440. In the depicted embodiment, wrapping member 440 has an asymmetric, substantially rectangular shape, wherein the wrapping member comprises a first piece of material 448 and a second piece of material 449. First and second pieces of material 448 and 449 comprise non-frangible materials that are coupled together via tear stitching 422. First piece of material 448 may be described as a connecting member, which may be configured similarly as and may function similarly to connecting members 150 and 250, described herein. First piece of material 448 may comprise an alignment aperture 460, which may be configured similarly and may function similarly as alignment apertures 160, 260, and 360, described herein. During deployment, tear stitching 422 is configured to rupture such that an inflatable airbag inflatable curtain airbag coupled to mounting assembly can change configurations from a packaged state to a deployed state. As such, tear stitching 422 may function similarly as rupture point 343, described herein.

Opening 445 may be located on second piece of material 449, and may comprise a pentagonal shape, as depicted in FIG. 14. Opening 445 is configured to function similarly as openings 145 and 245, described herein, such that it may fit over mounting member 430. Mounting member 430 may comprise one or more mounting apertures and a receiving aperture for receiving first piece of material 448 of wrapping member 440. One skilled in the art will appreciate that the relative sizes of the first and second pieces of materials depicted in FIG. 14 are for illustrative purposes only and may vary.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 ¶6. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An inflatable airbag assembly, comprising:

an inflatable curtain airbag comprising a first landmark; and a mounting assembly, comprising:

a mounting member; and a connecting member coupled to the mounting member and the inflatable curtain airbag, wherein the connecting member comprises an alignment aperture located at a predetermined location such that when the alignment aperture is at least partially aligned with the first landmark, the mounting assembly is located at a predetermined location on the inflatable airbag along at least one axis.

2. The inflatable airbag assembly of claim 1, wherein the mounting assembly further comprises a wrapping member that is configured to wrap around an external surface of an inflatable curtain airbag and retain the airbag in a rolled configuration, and wherein the wrapping member and the connecting member each comprise alignment apertures, and wherein the connecting member and the wrapping member are positioned on the mounting assembly such that the alignment apertures at least partially overlap.

3. The inflatable airbag assembly of claim 1, wherein the landmark comprises a seam.

4. The inflatable airbag assembly of claim 1, wherein the landmark comprises an ink mark.

5. The inflatable airbag assembly of claim 1, wherein the inflatable airbag comprises a second landmark that denotes a predetermined position along a second axis of the inflatable airbag.

6. The inflatable airbag assembly of claim 1, wherein the inflatable curtain airbag further comprises a second landmark; and, an external tether configured to be coupled to the inflatable airbag and extending to a vehicle structure, wherein the external tether comprises a second alignment aperture that is located at a predetermined position on the external tether, such that when the second alignment aperture is aligned with the second landmark on the inflatable airbag, the external tether is located at a predetermined location on the inflatable airbag along at least one axis.

7. The inflatable airbag assembly of claim 6, wherein the first landmark and the second landmark comprise different portions of a contiguous landmark.

8. The inflatable airbag assembly of claim 7, wherein the contiguous landmark comprises a perimeter seam.

9. The inflatable airbag assembly of claim 1, wherein the mounting assembly further comprises a wrapping member that is configured to wrap around an external surface of an inflatable curtain airbag and retain the airbag in a rolled configuration, and wherein the wrapping member comprises an alignment aperture, and wherein the connecting member and the wrapping member are positioned on the mounting assembly such that their respective alignment apertures at least partially overlap.

10. The inflatable airbag assembly of claim 1, wherein the assembly further comprises an inflator fill tube that is coupled to the inflatable airbag, and wherein the fill tube comprises a second alignment aperture that is located at a predetermined position on the inflator fill tube such that when the second alignment aperture is aligned with a second landmark on the inflatable airbag, the inflator fill tube is located at a predetermined location on the inflatable airbag along at least one axis.

11. The inflatable airbag assembly of claim 1, wherein the inflatable airbag comprises a second landmark that denotes a predetermined position along a second axis of the inflatable airbag.

12. A method of manufacturing an inflatable airbag assembly, the method comprising the steps of:

providing an inflatable airbag comprising a first landmark at a predetermined location;

providing a modular component comprising an alignment aperture at a predetermined location placing the modular component on the inflatable airbag such that a portion of the inflatable airbag is visible through the alignment aperture;

aligning the alignment aperture and the landmark along at least one axis of the inflatable airbag such that a portion of the landmark is visible within the alignment aperture;

orienting the modular component in a predetermined orientation relative to the inflatable airbag; and coupling the modular component to the inflatable airbag, while viewing the landmark through the alignment aperture, such that the modular component is retained in the predetermined location and retains the predetermined orientation.

13. The method of claim 12, wherein the inflatable airbag comprises a second landmark.

14. The method of claim 13, wherein the second landmark is positioned in relation to the first landmark such that at least a portion of both the first and the second landmarks can be viewed through the alignment aperture at the same time.

15. The method of claim 13, further comprising the step of aligning the alignment aperture of the modular component with the first and second landmarks.

16. The method of claim 13, wherein a second alignment aperture is located at a predetermined location on the modular component.

17. The method of claim 16, further comprising the step of aligning the first alignment aperture of the modular component with the first landmark and aligning the second alignment aperture with the second landmark.

18. The method of claim 13, further comprising the step of providing a second modular component having an alignment aperture located at a predetermined location on the second modular component.

19. The method of claim 18, further comprising the step of aligning the alignment aperture of the second modular component with the second landmark such that a portion of the second landmark is visible through the alignment aperture of the second modular component.

20. An inflatable airbag assembly, comprising:

an inflatable airbag comprising a first landmark at a predetermined location; and a modular component having an alignment aperture, wherein the alignment aperture is located at a predetermined location on the modular component, and wherein the alignment aperture has a diameter within a range from about 3 mm to about 20 mm, whereby when the alignment aperture is at least partially aligned with the first landmark, a portion of the inflatable airbag is visible through the alignment aperture, and the modular component is located at a predetermined location on the inflatable airbag and with a predetermined orientation along at least one axis.

21. The inflatable airbag assembly of claim 20, wherein the first landmark comprises a seam.

22. The inflatable airbag assembly of claim 20, wherein the first landmark comprises an ink mark.

23. The inflatable airbag assembly of claim 20, wherein the inflatable airbag comprises a second landmark that denotes a predetermined position along a second axis of the inflatable airbag.

24. The inflatable airbag assembly of claim 23, wherein the first landmark and the second landmarks comprise different portions of a contiguous landmark.

25. The inflatable airbag assembly of claim 24, wherein the contiguous landmark comprises a perimeter seam.

26. The inflatable airbag assembly of claim 20, wherein the modular component comprises an external tether.

27. The inflatable airbag assembly of claim 20, wherein the modular component comprises an inflator fill tube.

28. The inflatable airbag assembly of claim 27, wherein the inflator fill tube is coupled to the inflatable airbag, and wherein the fill tube comprises a second alignment aperture that is located at a predetermined position on the inflator fill tube such that when the second alignment aperture is aligned with a second landmark on the inflatable airbag, the inflator fill tube is located at a predetermined location on the inflatable airbag along at least one axis.

29. The inflatable airbag assembly of claim 20, wherein the inflatable airbag comprises an inflatable curtain airbag.

30. The inflatable airbag assembly of claim 29, wherein the modular component comprises a mounting assembly, comprising:

a mounting member; and a connecting member coupled to the mounting member and the inflatable airbag.

31. The inflatable airbag assembly of claim 30, wherein the mounting assembly further comprises a wrapping member that is configured to wrap around an external surface of an inflatable curtain airbag and retain the airbag in a rolled configuration, and wherein the wrapping member and the connecting member each comprise alignment apertures, and wherein the connecting member and the wrapping member are positioned on the mounting assembly such that the alignment apertures at least partially overlap.

* * * * *